United States Patent
Li et al.

(10) Patent No.: US 9,507,903 B2
(45) Date of Patent: Nov. 29, 2016

(54) METHOD FOR ESTIMATION OF DELAYS AND SLEWS DURING CIRCUIT OPTIMIZATION

(71) Applicant: Oracle International Corporation, Redwood City, CA (US)

(72) Inventors: Ruiming Li, Austin, TX (US); Rajendran Panda, Round Rock, TX (US); Tong Xiao, San Jose, CA (US); Ted Hong, San Jose, CA (US); Xiaomi Mao, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/662,577

(22) Filed: Mar. 19, 2015

(65) Prior Publication Data

US 2016/0154918 A1   Jun. 2, 2016

Related U.S. Application Data

(60) Provisional application No. 62/085,704, filed on Dec. 1, 2014.

(51) Int. Cl.
G06F 17/50 (2006.01)

(52) U.S. Cl.
CPC ....... *G06F 17/5068* (2013.01); *G06F 17/5009* (2013.01); *G06F 17/5081* (2013.01)

(58) Field of Classification Search
USPC .......................................................... 716/113
See application file for complete search history.

(56) References Cited

U.S. PATENT DOCUMENTS

| | | | |
|---|---|---|---|
| 2004/0205683 | A1 | 10/2004 | Kovacs-Birkas et al. |
| 2004/0250225 | A1* | 12/2004 | Tetelbaum .......... G06F 17/5022 716/113 |
| 2007/0234266 | A1* | 10/2007 | Chen .................. G06F 17/5054 716/113 |
| 2009/0013292 | A1* | 1/2009 | Brunet ............... G06F 17/5031 716/113 |
| 2009/0070720 | A1* | 3/2009 | Bergamaschi ...... G06F 17/5031 716/113 |

OTHER PUBLICATIONS

"RC Delay Metrics for Performance Optimization", Charles J. Alpert et al., May 2001, pp. 571-582.
"Closed-Form Expressions for Extending Step Delay and Slew Metrics to Ramp Inputs for RC Trees", Chandramouli V. Kashyap et al., Apr. 2004, pp. 509-516.
"Simple Metrics for Slew Rate of RC Circuits Based on Two Circuit Moments", Kanak Agarwal et al., Jun. 2003, pp. 950-953.
"Asymptotic Waveform Evaluation for Timing Analysis", Lawrence T. Pillage et al., Apr. 1990, pp. 352-366.
"Rice: Rapid Interconnect Circuit Evaluation Using Awe", Ratzlaff et al., Jun. 1994, pp. 763-776.
"Reduced-Order Modeling of Large Passive Linear Circuits by Means of the SyPVL AlgorithmΔ, Freund et al., 1996, pp. 280-287.
"PRIMA: Passive Reduced-Order Interconnect Macromodeing Algorithm", Altan Odabasioglu et al, Aug. 1998, pp. 645-654.

\* cited by examiner

*Primary Examiner* — Mohammed Alam
(74) *Attorney, Agent, or Firm* — Meyertons, Hood, Kivlin, Kowert & Goetzel, P.C.

(57) ABSTRACT

A method for the simulation of a circuit is disclosed. The method may include the determination of parasitic circuit elements, and the determination of one or more operational parameters dependent upon at least the parasitic circuit elements. A model of the parasitic circuit elements may then be generated based upon the one or more operational parameters. The circuit may then be simulated using the model of the parasitic circuit elements to determine a performance level of the circuit. At least one active circuit element may be modified in response to determining that the performance level does not meet a goal.

20 Claims, 8 Drawing Sheets

(12)  US 9,507,903 B2

METHOD FOR ESTIMATION OF DELAYS AND SLEWS DURING CIRCUIT OPTIMIZATION

PRIORITY CLAIM

The present application claims benefit of priority to provisional application No. 62/085,704 titled "METHOD FOR ESTIMATION OF DELAYS AND SLEWS DURING CIRCUIT OPTIMIZATION" and filed on Dec. 1, 2014 which is incorporated by reference in its entirety as though fully and completely set forth herein.

BACKGROUND

1. Technical Field

This disclosure relates to integrated circuit design and more specifically to modeling of interconnect wiring in a design.

2. Description of the Related Art

In modern integrated circuit design, a single integrated circuit may include numerous functional units, each of which may be designed to perform a specific function. Each functional unit may be designed in accordance with various design styles dependent upon circuitry included within a given functional unit. For example, a functional unit that includes analog circuitry may be designed using schematics capture, hand-crafted mask design, and circuit simulation. Other functional units may be designed by describing the behavior of digital functions using a hardware description language, such as, e.g., Verilog or VHDL.

When designing a functional unit using a hardware description language, the design of the functional unit may go through various operations before the design is ready for manufacture. For example, logical tests may be performed on the hardware description language to ensure the logical operation of the functional unit is correct. Once the logical operation has been verified, the hardware description language may be translated into a collection of predefined logic gates (commonly referred to as "standard cells") through a process called "synthesis."

Once synthesis is complete, the physical placement, orientation, and interconnection of the standard cells may then be performed. Various techniques and algorithms, such as, e.g., simulated annealing, may be employed to determine a location for a given standard cell of the collection of standard cells used to implement the desired logic functions of the functional unit. Once a location has been determined for each standard cell, the interconnection (or "routing") between the various standard cells may then be performed. Collectively, this process is commonly referred to as "place and route." Following place and route, additional testing and verification steps may be performed before artworks, i.e., photo masks for the semiconductor manufacturing process, are generated.

SUMMARY OF THE EMBODIMENTS

The present disclosure provides systems and methods for generating optimized circuit design parameters. To that end, systems and methods disclosed herein provide the expression of algorithms that allow the simulation of a circuit using a reduced order parasitic circuit element model, wherein the reduced order parasitic model is constructed from implicit information about the parasitic elements of the circuit.

In a non-limiting embodiment, the algorithm may determine a plurality of parasitic circuit elements for each of a plurality of circuit paths in a circuit. For at least one circuit path, one or more operational parameters may be determined dependent upon the plurality of parasitic circuit elements corresponding to the given circuit path. A model of the parasitic circuit elements may then be determined using the operational parameters. A number of parasitic circuit elements included in the model may be less than a number of parasitic circuit elements included in the plurality of parasitic circuit elements. The circuit may then be simulated to determine a performance level of the circuit. In response to a determining that the performance level does not meet a goal, at least one circuit element may then be modified.

In one implementation, determining the one or more operational parameters includes performing a timing analysis of the circuit. In another embodiment, determining the plurality of parasitic circuit elements includes performing an extraction of mask design data.

In a further embodiment, the model includes a plurality of resistors and a plurality of capacitors. In another non-limiting embodiment, to generate the model dependent upon on the one or more operational parameters includes determining values for two resistors and two capacitors based on one or more operational parameters.

Figure 1:
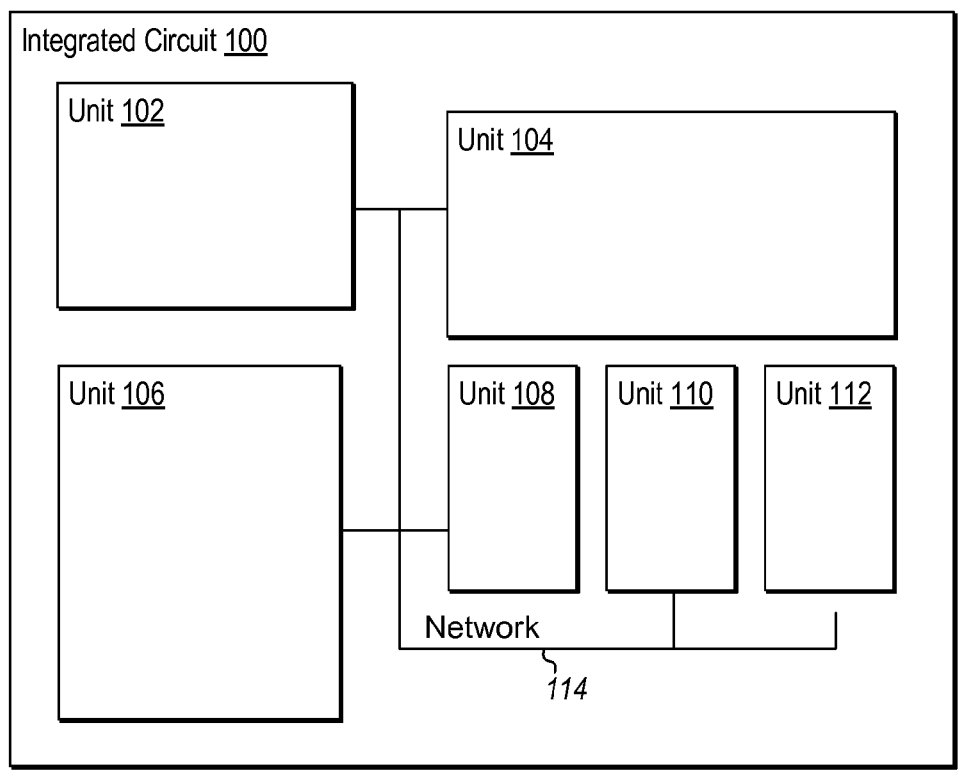
FIG. 1 is a block diagram of one embodiment of an integrated circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

During design of an integrated circuit, portions of the integrated circuit may be adjusted at various stages of the design process. Such adjustments may be performed to improve performance, reduce power and/or area, and correct timing issues, such as, setup time, hold time, or slew violations. Adjustments may be made to the size of transistors in a gate. Alternatively, transistors with different voltage thresholds may be employed for various circuit paths. In some cases, buffer circuits may be inserted into a given circuit path to accommodate a larger load, or drive a signal additional distance. Other adjustments may include rerouting or rearranging the placement of circuit elements, replacement of portions of circuitry with different circuit elements that perform the same logical function, removal of circuit elements, and the like.

An Electronic Design Automation (EDA) tool may be employed to analyze and perform changes to an integrated circuit. In various embodiments, the EDA tool may operate in an iterative fashion during which candidate logic gates may be identified, changes to the identified gates evaluated to assess a benefit of the changes, and changes recorded and/or applied to the circuit. Changes may continue to be made in an iterative fashion, until further benefit is no longer desirable or a maximum number of changes or iterations has been reached. While assessing the benefit of a particular change, the EDA tool may examine changes in signal delays and slew rates from a set of base values determined from an initial analysis of the circuit. As used and described herein, a slew rate is a rate at which a given logic signal transitions from one logic state to another.

When performing such changes to an integrated circuit, a large number (in some cases as many as one million) of gates may be analyzed, resulting in long simulation times and a need for large computer resources. In some cases, numerous iterations may be performed before a solution is reached. Some EDA tools may simplify the circuit to be analyzed by reducing a number of parasitic circuit elements. Such simplifications, while improving simulation time and reducing computer resource requirements, may result in a reduction in accuracy. The embodiments illustrated in the drawings and described below may provide techniques for improving run-time and memory foot print of the analysis while maintaining a desired accuracy level.

A block diagram of an embodiment of an integrated circuit is illustrated in FIG. 1. Integrated circuit 100, denoted as "IC 100," includes a number of circuit or functional units (e.g., 102, 104, 106, 108, 110, and 112) and an interconnection network 114, which couples together the various circuit units. In some embodiments, the circuit blocks may include memories such as, e.g., static random-access memories (SRAMs), mixed-signal analog circuits such as, e.g., phase-locked loops (PLLs), or a central processing unit (CPU) which may implement any suitable instruction set architecture (ISA), such as, e.g., the ARM™, PowerPC™, SPARC™ or x86 ISAs, or combination thereof.

Circuit units 102, 104, 106, 108, 110, and 112 may be constructed by different methods. In some embodiments, the blocks may be "full custom" designs where a circuit designer and a layout designer collaborate to create the circuits and mask design artwork used to create the photo-masks necessary to fabricate the circuit block. In other embodiments, the blocks may be created from a software description of the circuit block's functionality using a language such as, e.g., Verilog or VHDL. The software description may be compiled and synthesized into instances of logic gates from a standard cell library. The placement of the logic gates and wiring interconnect between the logic gates may then be optimized through a process commonly referred to as "place and route."

Once place and route has been completed, it is desirable to verify the operation of each of the aforementioned circuit units before a semiconductor manufacturing process is initiated. After the circuit is fabricated, actual physical properties and characteristics of the physical wires corresponding to the wiring interconnect between gates may affect circuit performance. In various embodiments, such properties and characteristics may be modeled as parasitic circuit elements during simulation of the circuit. Such parasitic circuit elements may, in various embodiments, include resistors, capacitors, inductors, and any other suitable passive circuit elements, and may adversely affect the operation of a given circuit block. For example, a combination of a resistance and capacitance of a given wire may slow the propagation of a signal through the given wire, which may result in timing violations causing functional failures within a circuit unit.

To compensate for parasitic circuit elements resulting from the manufacture of an integrated circuit, estimates of such elements may be made based on the mask design artwork available after place and route has been completed. Such estimates may use geometric dimensions of wires and physical properties of the materials used during manufacture to generate estimates of parasitic circuit elements associated with the wiring interconnect. The estimated parasitic circuit elements may be described in a netlist, i.e., a text listing of each parasitic circuit element describing how the element is connected to circuit nodes as well as properties of the element, such as a value of the element, for example.

As will be described in more detail below, once estimates of the parasitic circuit elements within a circuit unit are available in a netlist or any other suitable format, a simulation may be performed to check a performance level of the circuit unit. Based on the results of the simulations, circuit elements and wiring may be adjusted in order to change a simulated performance level to meet a desired level of performance. As used and described herein, an active circuit element is a transconductance element that is capable of translating an input voltage level to an output current level. A circuit unit may be re-simulated once the circuit elements (either active or passive) have been adjusted to verify the changes have the desired effect. In various embodiments, the adjustment procedure may be repeated numerous times until the desired level of performance has been achieved.

The number of parasitic circuit elements in a given circuit unit can be quite large. In some embodiments, a circuit unit may include millions of gates and even more parasitic circuit elements. As a result of the large number of elements, simulations may take a long time to complete, and require significant compute resources. In order to reduce simulation time, models of the parasitic circuit elements may be generated that simulate in less time and still provide sufficient accuracy. The embodiments described herein may provide techniques for generating such models, thereby reducing simulation time while maintaining simulation accuracy.

It is noted that the embodiment illustrated in FIG. 1 is merely an example. In other embodiments, different numbers of circuit units and different configurations of circuit units may be employed.

Figure 2:
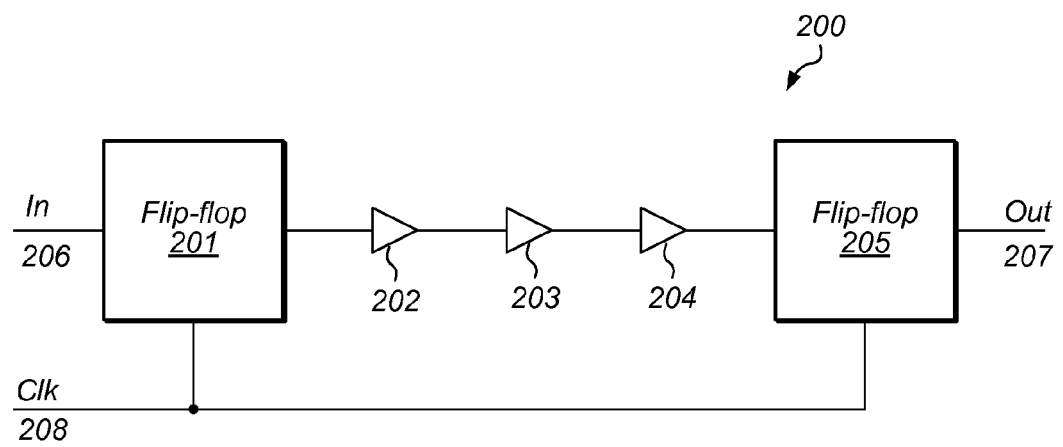
FIG. 2 illustrates an embodiment of a circuit path of an integrated circuit.

FIG. 2 illustrates a block diagram of an embodiment of multiple circuit paths of an integrated circuit, such as, integrated circuit 100, for example. In some embodiments, circuit path 200 may correspond to all or part of a circuit path in any of circuit units 102, 104, 106, 108, 110, and 112. In the illustrated embodiment, circuit path 200 includes flip-flop circuits 201 and 205, and logic gates 202 through 204. Each of logic gates 202 through 204, and flip-flops 201 and 205 may have been selected from a standard cell library during a synthesis process based on a HDL description of a functional unit.

Signal IN 206 is coupled to flip-flop 201, which is, in turn, coupled to logic gate 202. Logic gate 202 is further coupled to logic gate 203, which is, in turn, coupled to logic gate 204. An output of logic gate 204 is coupled to flip-flop 205, whose output is coupled to signal OUT 207. Flip-flops 201 and 205 are further coupled to signal CLK 208. It is noted that although logic gates 202 through 204 are depicted as being buffers in the illustrated embodiment, in other embodiments, any suitable combination of logic gates may be employed. It is further noted that flip-flop circuits as described and used herein, may be implemented in accordance with any number of design styles, such as, e.g., dynamic or static circuit design styles. Although the foregoing discussion references flip-flops circuit, in other embodiments, latches, pulse latches, or any other circuit suitable for managing the timing of circuit paths 200 may be employed.

During operation, data received via signal IN 206 may be transferred from a master stage to a slave stage of flip-flop 201 responsive to a transition of signal CLK 208. In some embodiments, the transition may be from a low level to a high level, while, in other embodiments, the transition may be from a high level to a low level. The data may then propagate from the slave stage of flip-flop 201 to logic gate 202. Each of logic gates 202 through 204 may, in turn, perform a corresponding logic function. Although logic gates 202 through 204 are depicted as receiving only a single input, in other embodiments, any of logic gates 202 through 204 may receive data from multiple sources, such as, e.g., other flip-flop or logic gates (all not shown).

It is noted that "logic 1", "high", "high state", or "high level" refer to a voltage sufficiently large to turn on an n-channel metal-oxide semiconductor field-effect transistor (MOSFET) and turn off a p-channel MOSFET, while "logic 0", "low", "low state", or "low level" refers to a voltage that is sufficiently small enough to do the opposite. In other embodiments, different technology may result in different voltage levels for "low" and "high."

Connections between the various logic gates and flip-flops may include parasitic circuit elements when manufactured. As a result, the time required for a signal output from flip-flop 201 to propagate through logic gates 202, 203, and 204, to the input of flip-flop 205 may take longer than the period of time flip-flop 205 is available to receive new data. As a result, flip-flop 205 may not be able to correctly capture and store the intended value, resulting in a functional failure within the path. In other cases, the parasitic circuit elements may result in the data to be captured not being present at the input of flip-flop 205 for a sufficiently long period of time to allow for the capture of the data. In some embodiments, the wiring associated with signal CLK 208 may also include parasitic circuit elements, which may change a propagation time of signal CLK 208 to various points within a circuit unit. Additionally, there may be constraints on the slew rate of signals at both the driver and receiver ends of a given circuit path, to control power consumption, circuit performance, and the like.

Based on simulation results with estimated parasitic circuit elements, circuit elements, such as, e.g., MOSFETs, within logic gates 202 through 204, and flip-flops 201 and 205, may be adjusted. In some embodiments, a size of MOSFET may be increased to source or sink more current to a wire during a transition from one logic state to another. The size of MOSFET may, in other embodiments, be decreased to reduce a load on a preceding logic gate, flip-flop, etc. Such changes may affect the time for a signal to propagate from one logic gate to another, thereby providing a mechanism to ensure data arrives at a flip-flop within the available data capture window. In other embodiments, logic gates may be added or removed, or a different implementation of gates may be employed. Alternatively, or additionally, wiring between logic gates, such as, e.g., logic gates 202 through 204, may be rerouted, moved to different metallization layers available in a semiconductor process, or changed in any other manner suitable for modifying the timing of the circuit.

It is noted that the embodiment illustrated in FIG. 2 is merely an example. In other embodiments, different logic gates and different configurations of logic gates are possible and contemplated.

Figure 3:
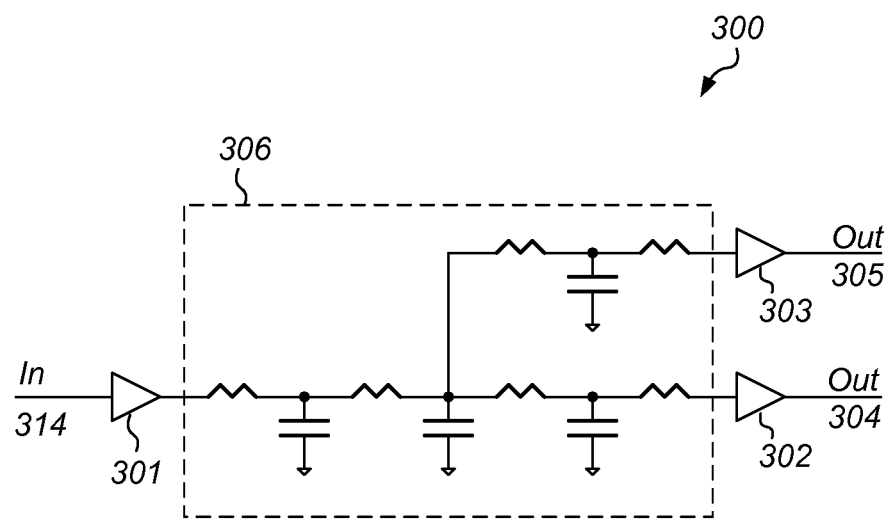
FIG. 3 is a block diagram illustrating an embodiment of a circuit path with parasitic circuit elements.

Turning to FIG. 3, an embodiment of a circuit path with parasitic circuit elements is illustrated. Circuit path 300 may, in some embodiments, include multiple logic gates, such as those illustrated in FIG. 2. In the illustrated embodiment, circuit path 300 includes logic gate 301, which is coupled to parasitic circuit element network 306. The output of parasitic circuit element network 306 is coupled to logic gates 303 and 302, which are, in turn, coupled to signals OUT 305 and OUT 304, respectively.

Parasitic circuit element network 306 may include assorted resistors and capacitors, and may be determined once place and route has been completed and mask design artwork is available. Using the mask design artwork an extraction may be performed to determine the connectivity and values of the resistors and capacitors included in parasitic circuit element network 306. It is noted that although resistors and capacitors are depicted in parasitic circuit element network 306, in other embodiments, other passive circuit elements, such as, e.g., inductors, may be included as well.

Extraction as used and defined herein describes a process in which physical dimensions as measured from the mask design artwork, layer thickness and physical properties of materials used in a semiconductor manufacturing process are used to determine an impedance network for a given portion of interconnect wiring. Resistor values may, for example, be determined using the length and width of a wire along with the thickness and resistivity of the material on which the wire is to be fabricated. In some embodiments, physical dimensions of a given collection of wires, along with conductor thickness and dielectric values of insulator material between the wires may be used to determine capacitor values. Once values have been determined for the parasitic circuit elements, the elements may be arranged in series and parallel configurations of pi-models, t-models, or other suitable circuit topologies, to improve simulation accuracy.

In some embodiments, once a simulation has been performed, the circuit may be modified. Such modifications may be made in response to determining that a performance level of the circuit path does not meet a goal. For example, based on simulation data, it may be determined that the time required for a signal to propagate from the output of logic gate 301 to the input of either of logic gates 303 or 304 is too large. As a result, the transconductance of active circuit elements within logic gate 301 may be increased to provide additional drive in order to decrease the propagation time.

It is noted that the embodiment illustrated in FIG. 3 is merely an example. In other embodiments, different parasitic circuit elements, and different arrangements of parasitic circuit elements may be employed.

Figure 4:
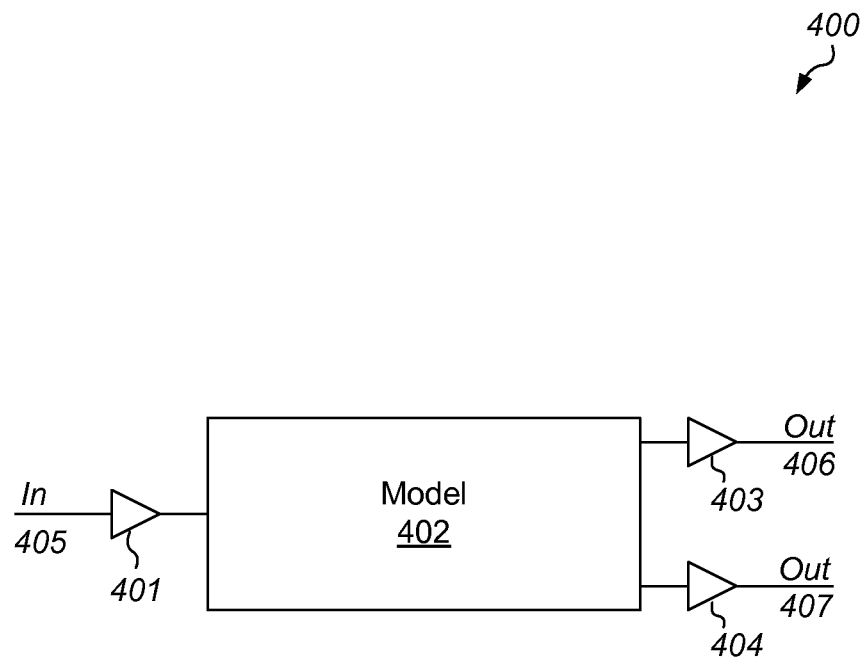
FIG. 4 is a block diagram illustrating an embodiment of a circuit path with a parasitic circuit element model.

An embodiment of circuit path employing a parasitic circuit element model is illustrated in FIG. 4. Circuit path 400 may, in some embodiments, correspond to any of circuit paths 200 or 300 as illustrated in FIG. 2 and FIG. 3, respectively. In the illustrated embodiment, signal IN 405 is coupled to logic gate 401, which is, in turn, coupled to model 402. Outputs of model 402 are coupled to logic gates 403 and 404, which are, in turn coupled to signals OUT 406 and OUT 407, respectively.

Model 402 may, in various embodiments, model parasitic circuit elements network 306 as illustrated in FIG. 3. In some embodiments, model 402 may include any suitable combination of resistors, capacitors, inductors, and the like, arranged in a network to model an impedance of a larger network, such as, e.g., parasitic circuit element network 306. In other embodiments, model 402 may be a mathematical description of a linear system.

The type and arrangement of circuit elements in model 402 may be determined using timing information from an initial circuit simulation. Model 402 may, in various embodiments, include any suitable combination of circuit elements, such as, e.g., resistors and capacitors. As described below in more detail in regard to FIG. 5, values for individual circuit elements may be calculated based on initial values for delay and slew. By determining values for circuit elements included in model 402, overall element count may be kept low, while maintaining a desired level of accuracy in subsequent simulations and circuit optimization operations.

As with circuit path 300 as illustrated in FIG. 3, circuit path 400 may be used in a simulation to determine performance of a corresponding circuit unit. Since model 402 includes less circuit elements than parasitic circuit element network 306, a simulation employing circuit path 400 may, in some embodiments, be completed in less time than a simulation performed using circuit path 300. In some embodiments, model 402 may include a number of circuit elements that is sufficient to provide a desired accuracy for signal propagation through circuit path 400.

It is noted that the embodiment illustrated in FIG. 4 is merely an example. In other embodiments, different circuit model types and different numbers of circuit models are possible and contemplated.

Figure 5:
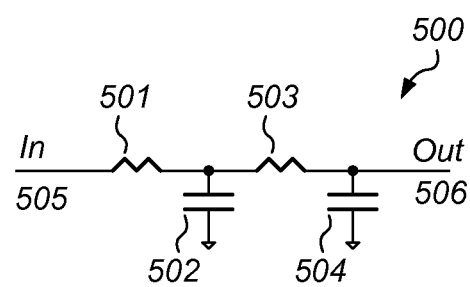
FIG. 5 is a block diagram illustrating an embodiment of a reduced order resistor capacitor model.

Turning to FIG. 5, an embodiment of a reduced order model is illustrated. Model 500 may, in various embodiments, correspond to model 402 as illustrated in the embodiment depicted in FIG. 4. In the illustrated embodiments, model 500 includes resistors 501 and 503, and capacitors 502 and 504. Signal IN 505 is coupled to resistor 501, which is, in turn, coupled to resistor 503 and capacitor 502. Resistor 503 is further coupled to capacitor 504 and signal OUT 506. One terminal of each of capacitors 502 and 504 is coupled to a ground or reference node.

In various embodiments, values for resistors 501 and 503, and capacitors 502 and 504 may be determined dependent upon operational parameters. As used and described herein, an operational parameter is a parameter that describes a particular performance metric of a circuit during operation. In some embodiments, operational parameters may include rise and fall times, i.e., slew rates, of signals coupled to the inputs and outputs of a parasitic circuit element network, such as parasitic circuit element network 306 as illustrated in FIG. 3. In some embodiments, operational parameters may include signal propagation delay through the network. It is noted that although delay and slew are used in the following description, in other embodiments, any operational parameter suitable for describing a performance level of a circuit, such as, e.g., power consumption, may be employed.

In some embodiments, a model, such as model 500, may be determined for each driver receiver pair. As described below in more detail, values of components included in the model may be estimated from interconnect delay and slew values using previously established mathematical relationships between circuit component values and performance for resistor-capacitor (RC) networks. Alpert, et al. (Alpert, C., Devgan, A., and Kashyap, C., *RC Delay Metrics for Performance Optimization*, IEEE TRANSACTIONS ON COMPUTER-AIDED DESIGN OF INTEGRATED CIRCUITS AND SYSTEMS, Vol. 20, No. 5, May 2001) discloses one such relationship, which contemplates using circuit moments to compute delay as depicted in equation 1. Two circuit moments may be calculated based on values of delay (d), the slew rate measured at the output of the driver (tr), and the slew rate measured at the input of the receiver (s). Assuming an infinite slope at the output of the driver, the relationship between the delay and the two moments, $m_1$ and $m_2$ is shown in equation 1.

$$Delay_{D2M} = \frac{m_1^2}{\sqrt{m_2}} \ln 2 \qquad (1)$$

Equation 1 can be used to determine a relationship for the finite, i.e., ramp, transition at the output of the driver. As disclosed by Kashyap, et al. (Kashyap, C. V., Alpert, F., Liu, F., and Devgan, A., *Closed-Form Expressions for Extending Step Delay and Slew Metrics to Ramp Inputs for RC Trees*, IEEE TRANSACTIONS ON COMPUTER-AIDED DESIGN OF INTEGRATED CIRCUITS AND SYSTEMS, Vol. 23, No. 4, April 2004), the modified relationship may be expressed as shown in equations 2 and 3.

$$Delay_{D2M_{Ramp}} = -(1-\alpha)m_1 + \alpha Delay_{D2M} \qquad (2)$$

$$\alpha = \left(\frac{2m_2 - m_1^2}{2m_2 - m_1^2 + \frac{tr^2}{12}}\right)^{\frac{5}{2}} \qquad (3)$$

In a similar fashion, relationships can be defined between the moments and the far (i.e., receiver) end and driver end slew rates of the propagated signal. As described in Agarwal, et al. (Agarwal, K., Sylvester D., and Blaauw, D., *Simple Metrics for Slew Rate of RC Circuits Based on Two Circuit Moments*, DAC '03, Jun. 2-6, 2003), these relationships may be expressed as is shown in equations 4 and 5.

$$SLEW_{S2M} = \frac{\sqrt{-m_1}}{\sqrt[4]{m_2}} \ln 9 \sqrt{2m_2 - m_1^2} \qquad (4)$$

$$SLEW_{S2M_{RAMP}} = \sqrt{SLEW_{S2M}^2 + tr^2} \qquad (5)$$

Values for $m_1$ and $m_2$ may be computed using equations 2, 3, and 5 using delay and slew values measured from simulation results of an initial simulation as described above. In some embodiments, a reduction in computation may be achieved by iterating the solution over the parameter α. By doing so, solving equations 2 and 5 may be reduced to solving a cubic equation, of which there is a closed form solution. In various embodiments, convergence to a solution may only take two or three iterations.

Once moments $m_1$ and $m_2$ have been determined, values for resistors 501 and 503 (designated $R_{501}$ and $R_{503}$, respectively) and capacitors 502 and 504 (designated $C_{502}$ and $C_{504}$, respectively) may be determined dependent upon the determined moments, and the load capacitance (designated $C_{load}$). The relationships between the moments and resistor and capacitor values may be seen in equations 6 and 7.

$$m_1 = -R_{501}(C_{502} + C_{504} + C_{load}) - R_{503}(C_{504} + C_{load}) \qquad (6)$$

$$m_2 = -R_{501}R_{503}C_{502}(C_{504} + C_{load}) + m_1^2 \qquad (7)$$

In some embodiments, solutions to equations 6 and 7 may be non-physical, i.e., values for the one or more of the resistors and capacitors may be less than zero. In order to select only physical solutions to the equations 6 and 7, an additional constraint may be defined. In some embodiments, the sum of square errors (as shown in equation 8) may be minimized. When minimizing the sum of square errors (SSE), solutions for the resistor and capacitors values in equations 6 and 7 may be kept positive.

$$SSE = [m_1 + R_{501}(C_{502} + C_{504} + C_{load}) + R_{503}(C_{503} + C_{load})]^2 + \\ [m_2 + R_{501}R_{503}C_{502}(C_{504} + C_{load}) - m_1^2]^2 \qquad (8)$$

It is noted that the embodiment illustrated in FIG. 5 is merely an example. In other embodiments, different parasitic circuit elements, and different configurations of parasitic circuit elements are possible and contemplated.

Figure 6:
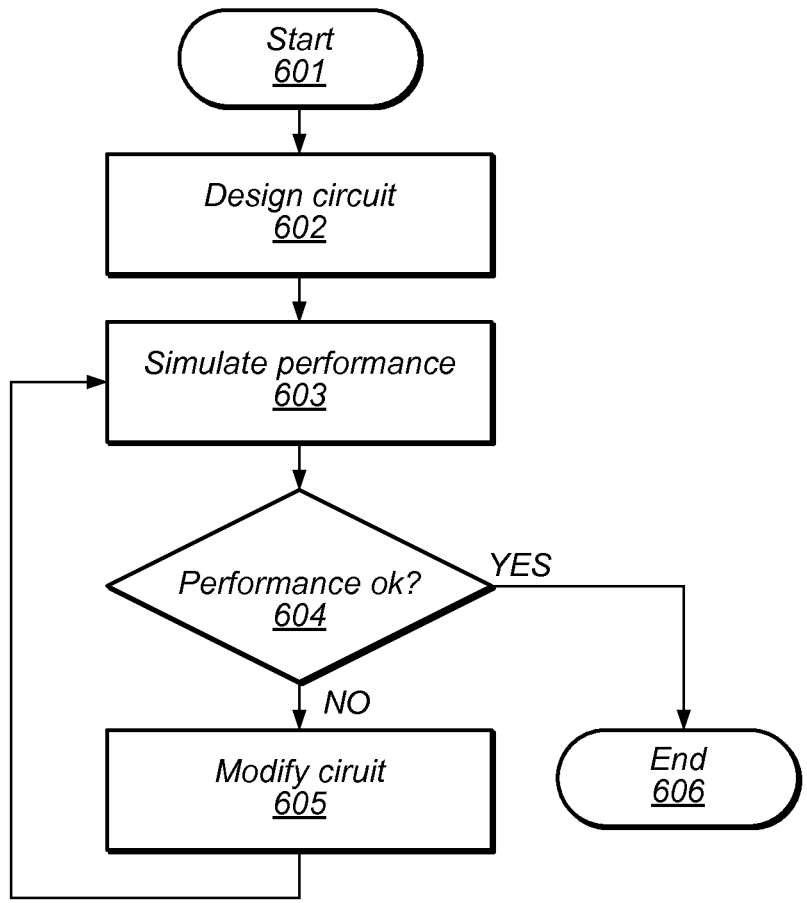
FIG. 6 illustrates a flow diagram depicting an embodiment of a method for designing an integrated circuit.

A flow diagram depicting an embodiment of a method for designing an integrated circuit is illustrated in FIG. 6. The method begins in block 601. A circuit unit may then be designed (block 602). In some embodiments, the design of the circuit unit may be performed using a hardware description language such as Verilog or VHDL. A functional description of a given circuit block may be encoded using the hardware description language. The functional description may be verified using a logic simulation tool to verify the description meets functional goals. Once the functional description has been verified, the given circuit block may then be synthesized using a synthesis tool and cell library. Physical design, i.e., placement of individual cells and generation of interconnect wiring, may then be completed in order to generate mask design artwork for the given circuit block.

The performance of the circuit block may then be simulated (block 603). In some embodiments, an extraction may be performed on the mask design artwork prior to simulation. Such an extraction may create a netlist describing active circuit elements as well as estimates of parasitic circuit elements, such as, e.g., wiring resistance. The simulation may include a static timing analysis and be performed using the extracted netlist and may include multiple test patterns at multiple test conditions, such as, power supply voltage level, temperature, and the like. The simulation may be a transistor level simulation or may be use higher-level models for collections of transistors to reduce simulation time and overhead.

The method may then depend on the simulated performance (block 604). In some embodiments, simulation results may be checked to determine the value of an operating parameter, such as, maximum clock frequency, for example. The determined value for one or more operating parameters may then be compared to predetermined goals. When the performance is acceptable, i.e., the determined values meet the predetermined goals, the method may conclude in block 606.

If, however, the simulated performance does not meet the predetermined goals, one or more circuits within the given circuit block may be modified (block 605). In some embodiments, the transconductance of active circuit elements within the given circuit block may be adjusted by changing a physical size of the active circuit elements, in order to provide more or less gain. Alternatively, a given logic gate selected from the cell library for use in a particular instance in the design may be exchanged with a different cell in the cell library that performs the same logic function. Once modifications to the circuit have been completed, the method may proceed from block 603 as described above.

It is noted that the method depicted in the flow diagram of FIG. 6 is merely an example. In other embodiments, different operations, and different orders of operations are possible and contemplated.

Figure 7:
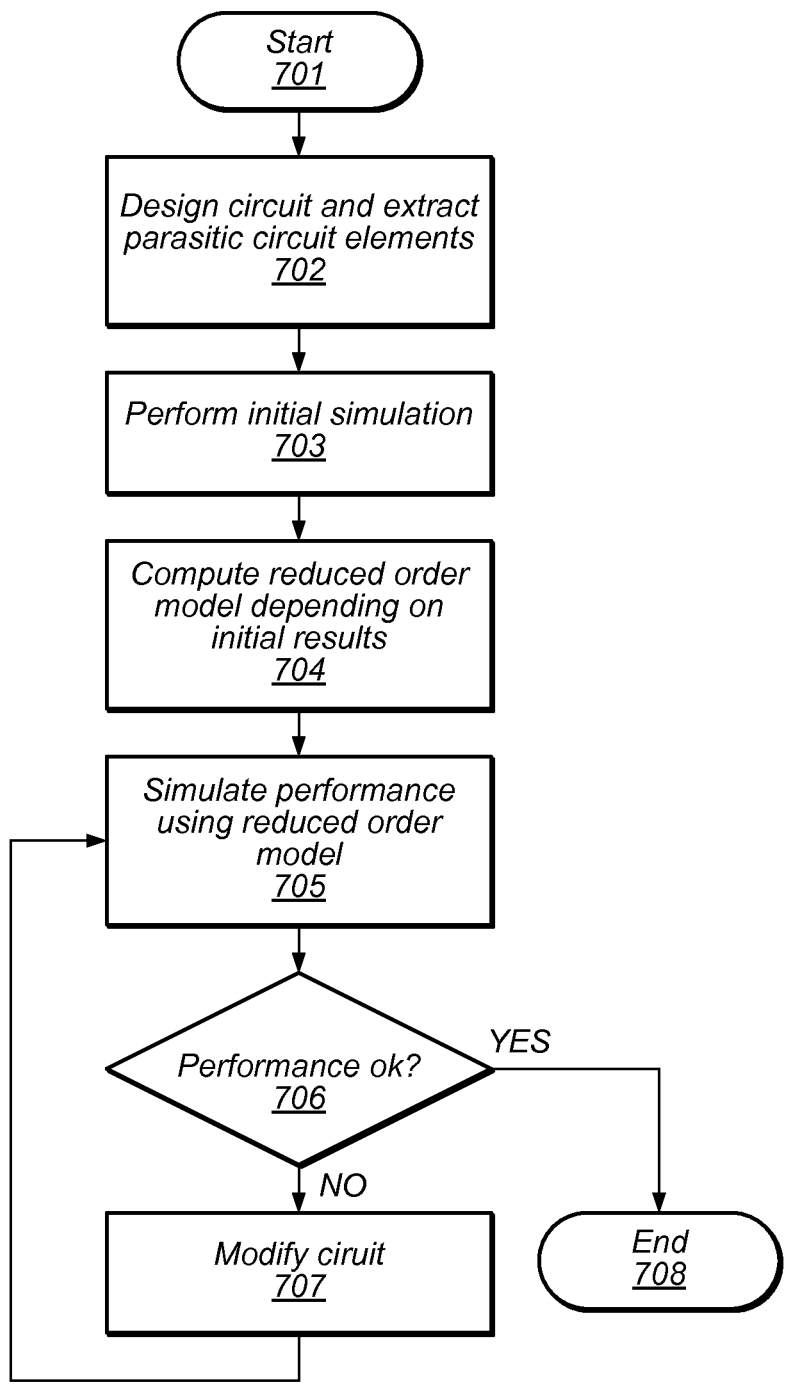
FIG. 7 illustrates a flow diagram depicting an embodiment of a method for designing an integrated circuit including performing timing analysis of the integrated circuit design.

Turning to FIG. 7, a flow diagram depicting an embodiment of a method for performing an analysis of an integrated circuit is depicted. The method begins in block 701. A circuit unit may then be designed and the parasitic circuit elements extracted (block 702). As described above in regard to FIG. 6, the circuit unit may be described using a hardware description language, and the resultant code may be synthesized, and mask design artwork generated using a place and route methodology.

Once the parasitic circuit elements have been extracted, an initial simulation may be performed (block 703). In some embodiments, the simulation may be performed using all extracted parasitic circuit elements. The simulation may, in various embodiments, be performed at a variety of test conditions, and with a variety of input stimuli (commonly referred to as "test vectors"). In some embodiments, the initial simulation may be performed without a prior extraction of parasitic circuit elements.

After the initial simulation has been performed, a reduced order model of the parasitic circuit element network, such as, e.g., parasitic element network 500 as illustrated in FIG. 5, may be computed (block 704) using the previously described method. In various embodiments, data from the initial simulation may be used to compute the reduced order model. It is noted that the results of the initial simulation may be generated for a given circuit in any suitable fashion that generates sufficient operational parameters to create the model. As described above in regard to FIG. 5, rise and fall times of signals input to and output from the parasitic circuit element network may be used to compute a new set of parasitic elements. The new set of parasitic elements may contain only a fraction of the number of elements, thereby allowing for reduced simulation time. The initial simulation 703 and subsequent simulations 705 may be carried out by different simulators, and data from initial simulations 703 may be shared with subsequent simulations.

Once the model has been computed, another simulation may be performed (block 705). In some embodiments, a netlist may be modified to remove a previous parasitic circuit element network, and replace it with the computed model. It is noted that in some simulations, multiple parasitic element networks associated with corresponding circuit paths, may each be replaced with their respective reduced order models. Since each reduced order model includes fewer parasitic circuit elements than the parasitic circuit element network it replaces, simulation time may be reduced. As described above in regard to the flow diagram of FIG. 6, values for any suitable set of operating parameters may be determined using data from the simulations.

The method may then depend on the simulated performance (block 706). In some embodiments, if values of one or more of the set of operating parameters meet desired goals, then the method may conclude in block 708. If, however, the simulated performance level does not meet the desired goals, then the circuit may be modified (block 707). As described above in regard to the flow diagram of FIG. 6, one or more circuit elements may be modified. Once the circuit modifications have been completed, the method may continue from block 705 as described above.

Although the operations illustrated in the flow diagram of FIG. 7 are depicted as being performed in a serial fashion, in other embodiments, one or more of the operations may be performed in parallel.

Figure 8:
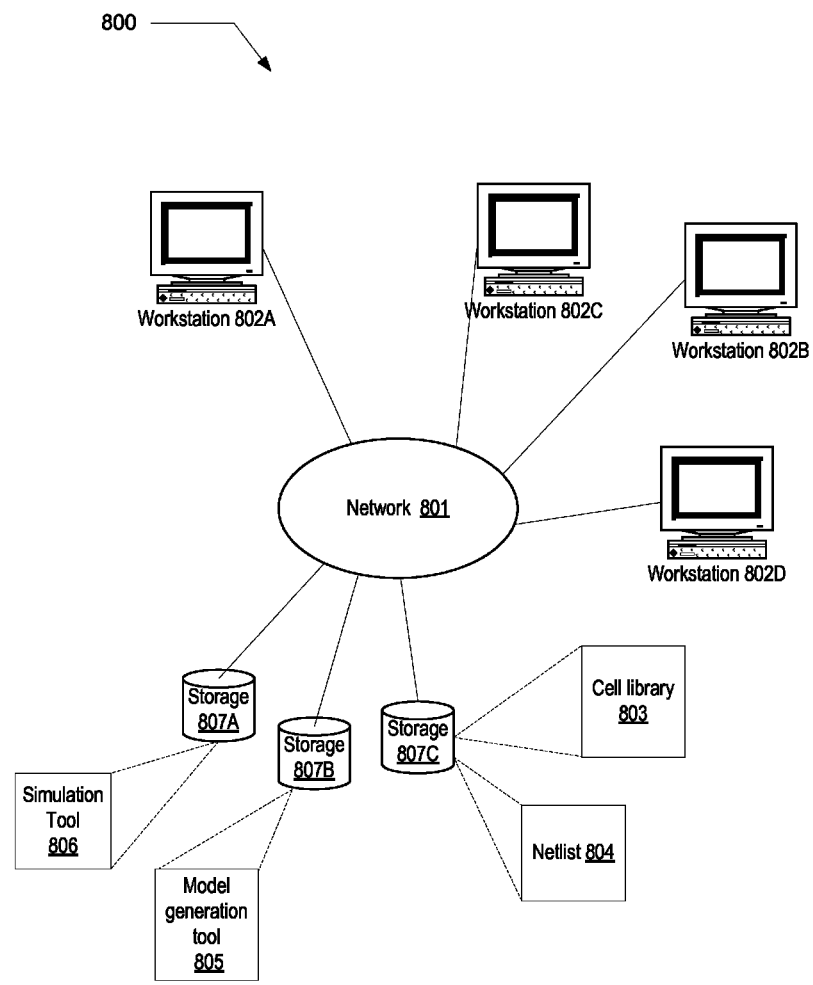
FIG. 8 is a block diagram of one embodiment of a computer system including an integrated circuit design tool that implements the embodiment of the method depicted in FIG. 7.

Turning to FIG. 8, a block diagram of one embodiment of a computer system including an integrated circuit design tool. The computer system 800 includes a plurality of workstations designated 802A through 802D. The workstations are coupled together through a network 801 and to a plurality of storages designated 807A through 807C. In one embodiment, each of workstations 802A-802D may be representative of any standalone computing platform that may include, for example, one or more processors, local system memory including any type of random access memory (RAM) device, monitor, input output (I/O) means such as a network connection, mouse, keyboard, monitor, and the like (many of which are not shown for simplicity).

In one embodiment, storages 807A-807C may be representative of any type of mass storage device such as hard disk systems, optical media drives, tape drives, ram disk storage, and the like. As such, program instructions comprising the design tools such as a circuit simulation tool may be stored within any of storages 807A-807C and loaded into the local system memory of any of the workstations during execution. As an example, as shown in FIG. 8, the simulation tool 806, is shown stored within storage 807A, while the netlist (which include parasitic circuit elements) 804 and the cell library 803 are stored within storage 807C. Further, the model generation algorithm tool 805 is stored within storage 807B. In one embodiment, the model generation algorithm tool 805 may be called by the simulation tool 806 either manually with user intervention, or automatically using additional program instructions such as scripting instructions. Additionally, the program instructions may be stored on a portable/removable storage media. The program instructions may be executed directly from the removable media or transferred to the local system memory or mass storages 807 for subsequent execution. As such, the portable storage media, the local system memory, and the mass storages may be referred to as non-transitory computer readable storage mediums. The program instructions may be executed by the one or more processors on a given workstation or they may be executed in a distributed fashion among the workstations, as desired.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-accessible storage medium having program instructions stored therein that, in response to execution by a computer system, causes the computer system to perform operations including:
   identifying a plurality of parasitic circuit elements for at least one circuit path of a plurality of circuits paths included in a circuit, wherein each circuit path of the plurality of circuit paths includes a plurality of circuit elements;
   determining one or more operational parameters of the at least one circuit path dependent upon at least the plurality of parasitic circuit elements, wherein the one or more operational parameters includes at least a rise time of a signal;
   generating a model of the plurality of parasitic circuit elements dependent upon the one or more operational parameters, wherein a number of parasitic circuit elements included in the model is less than a number of parasitic circuit elements included in the plurality of parasitic circuit elements;
   simulating the circuit using the model to determine a performance level of the circuit; and
   modifying at least one circuit element of the plurality of circuit elements included in the at least one circuit path responsive to determining the performance level does not meet a goal.

2. The non-transitory computer-accessible storage medium of claim 1, wherein determining the one or more operational parameters comprises performing a timing analysis of the at least one circuit path.

3. The non-transitory computer-accessible storage medium of claim 1, wherein identifying the plurality of parasitic elements for the at least one circuit path comprises performing an extraction of mask design data for the at least one circuit path.

4. The non-transitory computer-accessible storage medium of claim 1, wherein the model includes a plurality of resistors and a plurality of capacitors.

5. The non-transitory computer-accessible storage medium of claim 4, wherein generating the model comprises determining a respective value for each resistor of the plurality of resistors and for each capacitor of the plurality of capacitors.

6. The non-transitory computer-accessible storage medium of claim 5, wherein generating the model comprises minimizing a sum of square errors responsive to determining that a value of at least one resistor of the plurality of resistors or at least one capacitor of the plurality of capacitors is greater than zero.

7. A method, comprising:
identifying a plurality of parasitic circuit elements for at least one circuit path of a plurality of circuits paths included in a circuit, wherein each circuit path of the plurality of circuit paths includes a plurality of circuit elements;
determining one or more operational parameters of the at least one circuit path dependent upon the plurality of parasitic circuit elements, wherein the one or more operational parameters includes at least a rise time of a signal;
generating a model of the plurality of parasitic circuit elements dependent upon the one or more operational parameters, wherein a number of parasitic circuit elements included in the model is less than a number of parasitic circuit elements included in the plurality of parasitic circuit elements;
simulating the circuit using the model to determine a performance level of the circuit; and
modifying at least one circuit element of the plurality of circuit elements included in the at least one circuit path responsive to determining the performance level does not meet a goal.

8. The method of claim 7, wherein the plurality of parasitic elements includes a plurality of resistors and a plurality of capacitors.

9. The method of claim 7, wherein the one or more operational parameters includes at least a delay parameter and a slew parameter.

10. The method of claim 7, wherein the at least one circuit element comprises a driver circuit, wherein the driver circuit includes a plurality of metal-oxide semiconductor field-effect transistors (MOSFETs).

11. The method of claim 10, wherein modifying the at least one circuit element comprises adjusting a size of at least one MOSFET of the plurality of MOSFETs.

12. The method of claim 7, wherein each circuit path of the plurality of circuit paths includes a driver circuit and a receiver circuit.

13. The method of claim 12, wherein the one or more operational parameters includes a propagation delay of a signal from an output of the driver circuit to an input of the receiver circuit, a slope of a signal transition at the output of the driver circuit, and a slope of a signal transition at the receiver circuit.

14. The method of claim 7, wherein the model includes a plurality of resistors and a plurality of capacitors.

15. A system comprising:
one or more memories that, during operation, store instructions, and
one or more processors that, during operation, receive instructions from the one or more memories and execute the instructions to cause the system to perform operations comprising:
identifying a plurality of parasitic circuit elements for at least one circuit path of a plurality of circuits paths included in a circuit, wherein each circuit path of the plurality of circuit paths includes a plurality of circuit elements;
determining one or more operational parameters of the at least one circuit path dependent upon at least the plurality of parasitic circuit elements for the at least one circuit path, wherein the one or more operational parameters includes at least a rise time of a signal;
generating a model of the plurality of parasitic circuit elements dependent upon the one or more operational parameters, wherein a number of parasitic circuit elements included in the model is less than a number of parasitic circuit elements included in the plurality of parasitic circuit elements;
simulating the circuit using the model to determine a performance level of the circuit; and
modifying at least one circuit element of the plurality of circuit elements included in the at least one circuit path responsive to determining the performance level does not meet a goal.

16. The system of claim 15, wherein the plurality of circuit elements includes a driver circuit and a receiver circuit.

17. The system of claim 16, wherein the driver circuit includes a plurality of metal-oxide semiconductor field-effect transistors (MOSFETs).

18. The system of claim 17, wherein modifying the at least one circuit element comprises adjusting a size of at least one MOSFET of the plurality of MOSFETs.

19. The system of claim 15, wherein the model includes a plurality of resistors and a plurality of capacitors.

20. The system of claim 19, wherein generating the model comprises determining a respective value for each resistor of the plurality of resistors and for each capacitor of the plurality of capacitors.

* * * * *

UNITED STATES PATENT AND TRADEMARK OFFICE
CERTIFICATE OF CORRECTION

PATENT NO. : 9,507,903 B2  
APPLICATION NO. : 14/662577  
DATED : November 29, 2016  
INVENTOR(S) : Li et al.

It is certified that error appears in the above-identified patent and that said Letters Patent is hereby corrected as shown below:

On the Title Page

Column 2, under Other Publications, Line 13, delete "AlgorithmΔ," and insert -- Algorithm", --, therefor.

Column 2, under Other Publications, Line 14, delete "Macromodeing" and insert -- Macromodeling --, therefor.

Signed and Sealed this
Twentieth Day of June, 2017

Joseph Matal
*Performing the Functions and Duties of the
Under Secretary of Commerce for Intellectual Property and
Director of the United States Patent and Trademark Office*